J. T. LUCAS.
GAS METER LEAK DETECTOR.
APPLICATION FILED JUNE 19, 1911.
1,034,264.
Patented July 30, 1912.
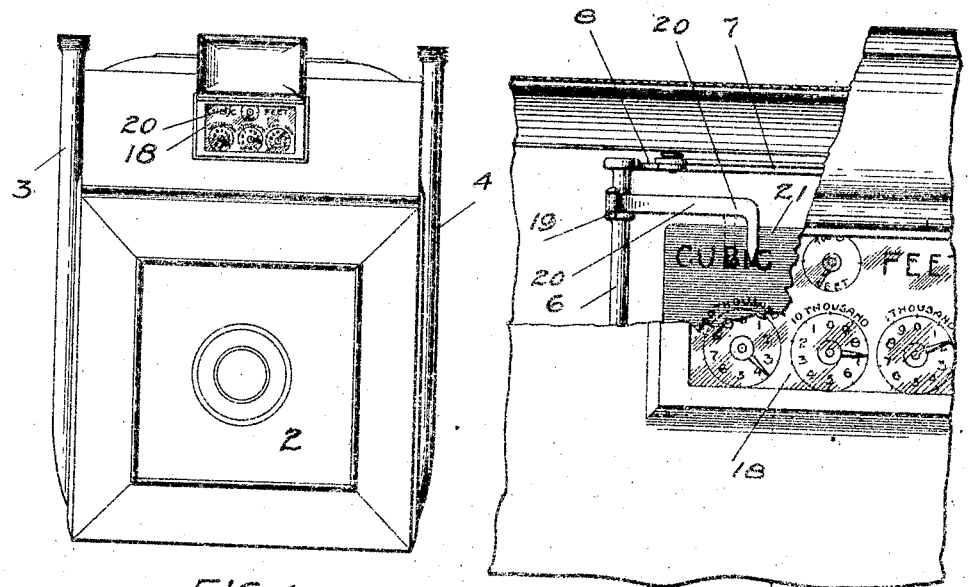
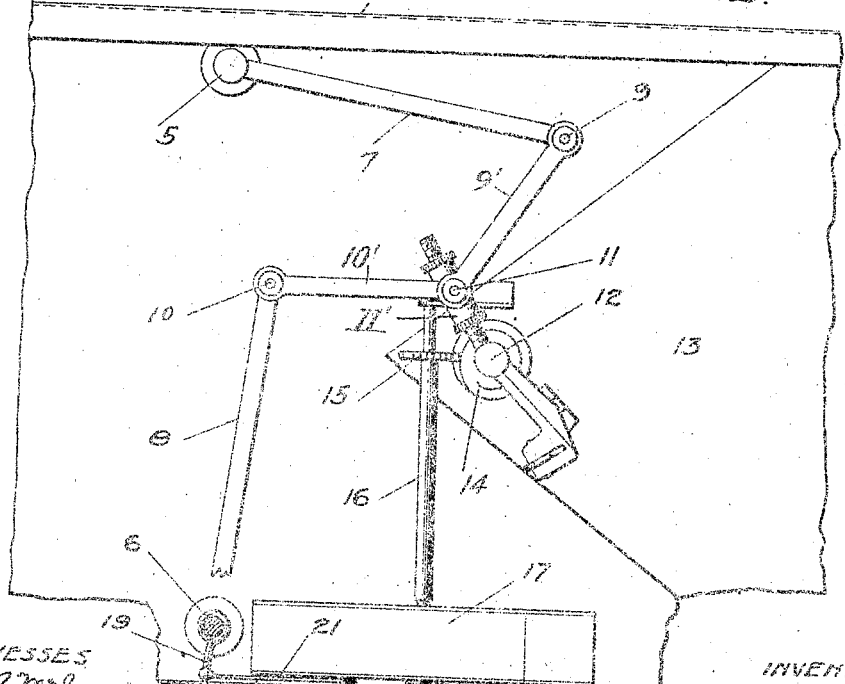

UNITED STATES PATENT OFFICE.

JOHN THOMAS LUCAS, OF MINNEAPOLIS, MINNESOTA, ASSIGNOR OF ONE-HALF TO L. F. BLYLER, OF MINNEAPOLIS, MINNESOTA.

GAS-METER LEAK-DETECTOR.

1,034,264.  Specification of Letters Patent.  Patented July 30, 1912.

Application filed June 19, 1911. Serial No. 634,057.

*To all whom it may concern:*

Be it known that I, JOHN THOMAS LUCAS, of Minneapolis, Hennepin county, Minnesota, have invented certain new and useful Improvements in Gas-Meter Leak-Detectors, of which the following is a specification.

For the purpose of detecting a leak in the gas pipes around the burners at the time the gas meter is installed, it is the practice of the person making the installation to make a careful observation of the indicator representing feet on the dial of the meter to see if it changes its position when the burners are all shut. To ascertain whether this indicator is affected by a leak of the gas it is necessary to watch it for a considerable time, usually about fifteen or twenty minutes.

The object of my present invention is to provide an attachment for a meter which will enable the person making the installation to ascertain within a comparatively short space of time whether or not there is any gas passing through the meter when the burners are closed.

My invention consists generally in an indicator hand mounted on a moving part of the meter mechanism, said hand being plainly visible and being instantly affected by a leakage of the gas.

In the accompanying drawing forming part of this specification, Figure 1 is a front view of a meter embodying my invention, Fig. 2 is a view of the upper portion of the meter, the wall being broken away, showing the operating mechanism, Fig. 3 is a top view showing the mechanism actuated by the passage of the gas through the meter and operating the indicator hands.

In the drawing, 2 represents the case of the meter having intake and discharge pipes 3 and 4. Within this case is the usual apparatus affected by the pressure of the gas for operating the indicating mechanism. This apparatus forms no part of my present invention and I have not thought it necessary to illustrate it herein.

5 and 6 represent rock shafts connected with the diaphragms, not shown, in the case of the meter, and oscillating arms 7 and 8 are pivotally connected at 9 and 10 with links 9' and 10' extending to pivot 11. This pivot is connected by a crank arm 11' with a spindle 12 which operates the valves contained in a box 13 and is provided with a worm 14 engaging a pinion 15 mounted on a shaft 16. A box 17 contains gears driven from the shaft 16 and connected with the indicator hands. These hands are visible through a transparent plate 18 mounted on the front of the casing. All this mechanism is common to meters as ordinarily constructed and I make no claim to the same herein.

Mounted on the rock shaft 6 is an arm 19 and an indicator 20 carried by said arm, and is movable back and forth in front of the dial 21. This shaft will be rocked if there is a passage of gas through the meter and its slightest movement will be transmitted to the indicator hand 20 and operate it also. The person installing the meter can thus, at a glance when the connections have been made, ascertain if there is any gas passing through the meter when the burners are closed. If there is, the indicator hand 20 will be moved and the letters on the dial in the rear of the hand will enable the observer to instantly detect the slightest change in the position of the hand. If there is any movement whatever he will know that there is a leakage in the piping in the house or building or at the burners and the leak having been detected can be found and closed before enough gas has escaped to cause an explosion.

I claim as my invention:—

1. The combination, with a meter casing having dials and indicator hands therefor and an operating mechanism arranged to revolve said hands, said mechanism including an upright rock shaft located near said dials and a secondary indicator hand connected with said rock shaft to move with the rocking of said shaft, said secondary indicator hand moving at a greater speed in a given time than said first named indicator hands, whereby a slight movement of said operating mechanism arising from a leakage of gas in the system, will produce a plainly visible movement of said secondary indicator.

2. The combination, with a meter casing having dials and indicator hands therefor and an operating mechanism arranged to revolve said hands, said mechanism including an upright rock shaft located near said dials, an arm mounted on said rock shaft and a secondary indicator hand connected with said arm and having a reciprocating movement, said secondary indicator hand operating at a greater speed in a given time than said first named indicator hands, whereby a slight movement of said operating mechanism arising from a leakage of gas in the system will produce a plainly visible movement of said secondary indicator.

In witness whereof, I have hereunto set my hand this 17th day of June 1911.

JOHN THOMAS LUCAS.

Witnesses:
GENEVIEVE E. SORENSEN,
CATHERINE H. REHFUSS.